United States Patent [19]

Acker et al.

[11] Patent Number: 5,338,848
[45] Date of Patent: Aug. 16, 1994

[54] INDOLIZINETRIMETHINE DYES

[75] Inventors: Michael Acker, Heidelberg; Bernhard Albert, Maxdorf; Michael Schmitt, Weinheim, all of Fed. Rep. of Germany

[73] Assignee: BASF Aktiengesellschaft, Ludwigshafen, Fed. Rep. of Germany

[21] Appl. No.: 90,041

[22] PCT Filed: Mar. 25, 1992

[86] PCT No.: PCT/EP92/00660

§ 371 Date: Jul. 20, 1993

§ 102(e) Date: Jul. 20, 1993

[87] PCT Pub. No.: WO92/17548

PCT Pub. Date: Oct. 15, 1992

[30] Foreign Application Priority Data

Apr. 4, 1991 [DE] Fed. Rep. of Germany ....... 4110808

[51] Int. Cl.$^5$ .......................................... C07D 401/04
[52] U.S. Cl. .................................. 546/112; 430/495; 430/945
[58] Field of Search ............... 546/112; 430/495, 945, 430/30

[56] References Cited

U.S. PATENT DOCUMENTS

| 3,260,601 | 7/1966 | Bailey | 430/93 |
| 3,398,145 | 8/1968 | Bedley | 430/93 |
| 3,660,085 | 5/1972 | Depoorter | 430/93 |
| 4,663,261 | 5/1987 | Franke | 430/93 |

FOREIGN PATENT DOCUMENTS

| 59804 | 12/1968 | Fed. Rep. of Germany . |
| 3928758 | 3/1990 | Fed. Rep. of Germany . |
| 1295754 | 5/1962 | France . |

OTHER PUBLICATIONS

Katritzky, *Advances in Heterocyclic Chemistry*, vol. 23, p. 103–104 and 134–135, 1978.
Research Disclosure, Oct. 1980, pp. 425–427.
Chemical Abstracts, AN 318601, JP-A-6 2227 693, Oct. 6, 1987.
Advances in Heterocyclic Chemistry, vol. 23, 1978, F. J. Swinbourne, et al., "Advances in Indolizine Chemistry", pp. 104–105 and 134–135.

*Primary Examiner*—C. Warren Ivy
*Assistant Examiner*—D. Margaret M. Mach
*Attorney, Agent, or Firm*—Oblon, Spivak, McClelland, Maier & Neustadt

[57] ABSTRACT

Indolizinetrimethine dyes useful for laser-optical recording media have the formula

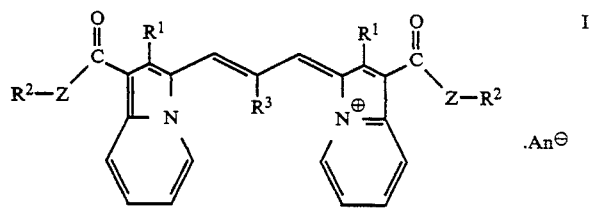

where the variables are defined as follows:
  $R^1$ is $C_1$–$C_{22}$-alkyl which may be substituted by halogen, hydroxyl, $C_1$–$C_6$-alkoxy, benzyloxy, $C_1$–$C_6$-alkanoyl, $C_1$–$C_6$-alkoxycarbonyl or phenyl, $C_3$–$C_7$-cycloalkyl, which may be substituted by halogen, $C_1$–$C_4$-alkyl or $C_1$–$C_4$-alkoxy, or phenyl which may be substituted by halogen, hydroxyl, cyano, $C_1$–$C_6$-alkyl, $C_1$–$C_6$-alkoxy, carboxyl, $C_1$–$C_6$-alkoxycarbonyl or hydroxysulfonyl,
  $R^2$ has one of the meanings of $R^1$, except than the carbon chain of $C_1$–$C_{22}$-alkyl may be interrupted by from one to five oxygen atoms in ether function,
  $R^3$ is hydrogen, halogen or $C_1$–$C_6$-alkyl,
  Z is —O— or —NH—, and
  An$^\ominus$ is one equivalent of an acid anion.

4 Claims, No Drawings

INDOLIZINETRIMETHINE DYES

The present invention relates to novel indolizinetrimethine dyes of the general formula I

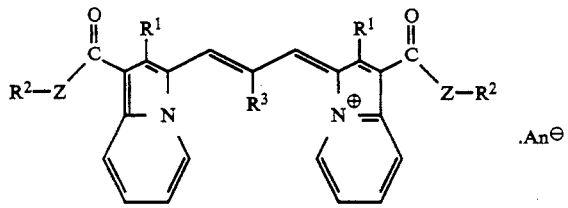

where the variables are defined as follows:

$R^1$ is $C_1$–$C_{22}$-alkyl which may be substituted by halogen, hydroxyl, $C_1$–$C_6$-alkoxy, benzyloxy, $C_1$–$C_6$-alkanoyl, $C_1$–$C_6$-alkoxycarbonyl or phenyl, $C_3$–$C_7$-cycloalkyl, which may be substituted by halogen, $C_1$–$C_4$-alkyl or $C_1$–$C_4$-alkoxy, or phenyl which may be substituted by halogen, hydroxyl, cyano, $C_1$–$C_6$-alkyl, $C_1$–$C_6$-alkoxy, carboxyl, $C_1$–$C_6$-alkoxycarbonyl or hydroxysulfonyl, $R^2$ has one of the meanings of $R^1$, except than the carbon chain of $C_1$–$C_{22}$-alkyl may be interrupted by from one to five oxygen atoms in ether function, $R^3$ is hydrogen, halogen or $C_1$–$C_6$-alkyl, Z is —O— or —NH—, and $An^\ominus$ is one equivalent of an acid anion and to optical recording media which contain dyes I.

Recording media which on high-energy irradiation undergo a local change of state are known. This thermally initiated change of state, e.g. vaporization, altered flow behavior or bleaching, is accompanied by a change in optical properties, for example in the absorption through a shift in the absorption maximum or absorbance, which can be utilized for information or data recording.

Suitable light sources for optical recording include inter alia semiconductor lasers which emit light in the near infrared. Of particular suitability here are solid state injection lasers, in particular the AlGaAs laser, which emits within the wavelength range of about 700–900 nm.

The use of this laser is particularly advantageous on account of the small size of the unit, its low energy requirements and the possibility of direct modulation of the optical output through modulation of the electric drive current.

The recording media used must meet the following requirements: the dyes present in the media should be highly absorbing within the desired wavelength range, they should be readily accessible industrially, and be stable to outside influences and readily soluble in alcohols and polymers, so that they can be made, for example by the spin coating process, into thin, homogeneous dye layers of high background reflectivity which are firmly adherent on the customary support materials. Moreover, the recording media should be writable and subsequently readable with a semiconductor laser and have a high signal-to-noise ratio.

The dyes hitherto used for optical recording media are frequently deficient in one of the requirements mentioned. This is also true of the indolizinetrimethine dyes known from JP-A-227 693/1987 and DE-A-39 28 758, which differ from the compounds I in particular in the nature of the substituents in the 3-position of the indolizine ring.

It is an object of the present invention to find optical recording media dyes which come particularly close to meeting the required property profile.

We have found that this object is achieved by the indolizinetrimethine dyes I defined at the beginning.

We have also found optical recording media for recording and reproducing information items by means of laser bees, which contain these dyes in the laser light-sensitive layer.

Preferred embodiments of the invention are revealed in subclaims.

Suitable $R^1$ and $R^2$ radicals here are $C_1$–$C_{22}$-alkyl groups such as methyl, ethyl, propyl, isopropyl, butyl, isobutyl, sec-butyl, tert-butyl, pentyl, isopentyl, neopentyl, tert-pentyl, hexyl, 2-methylpentyl, heptyl, octyl, 2-ethylhexyl, nonyl, decyl, undecyl, dodecyl, tridecyl, tetradecyl, pentadecyl, hexadecyl, heptadecyl, octadecyl, nonadecyl, eicosyl, heneicosyl and docosyl and also branched radicals of this kind, of which the alkyl groups of up to 12 carbon atoms are preferred and those of up to 8 carbon atoms are particularly preferred.

The alkyl groups mentioned may carry halogen such as fluorine, chlorine and bromine, hydroxyl, $C_1$–$C_6$-alkoxy, benzyloxy, $C_1$–$C_6$-alkanoyl, $C_1$–$C_6$-alkoxycarbonyl or phenyl as substituents, which are preferably in the ω-position. Under this definition, ω-bromo- and -hydroxy-$C_1$–$C_{12}$-alkyl groups are particularly preferred. Examples of these radicals are:

trifluoromethyl, trichloromethyl, bromomethyl, 2-bromoethyl, 1,1,1-trifluoroethyl, heptafluoropropyl and 4-bromobutyl, 2-hydroxyethyl, 2- and 3-hydroxypropyl, 2- and 4-hydroxybutyl, 5-hydroxypentyl, 6-hydroxyhexyl, 7-hydroxyheptyl and 8-hydroxyoctyl, 2-methoxyethyl, 2-ethoxyethyl, 2-propoxyethyl, 2-isopropoxyethyl, 2-butoxyethyl, 2- and 3-methoxypropyl, 2- and 3-ethoxypropyl, 2- and 4-ethoxybutyl, 2- and 4-isopropoxybutyl, 5-ethoxypentyl, 6-ethoxyethyl and 4-hydroxy-6-ethyldecyl, 2-benzyloxyethyl and 3-benzyloxypropyl, 2-acetylethyl, 2-propionylethyl, 3-acetylpropyl, 3-propionylpropyl, 4-acetylbutyl and 4-propionylbutyl, ethoxycarbonylmethyl, 2-ethoxycarbonylethyl and 2- and 3-methoxycarbonylpropyl, benzyl and 2-phenylethyl.

In the case of alkyl $R^2$, the carbon chain may be interrupted by oxygen atoms in ether function. In this case, $C_1$–$C_6$-alkyl preferably contains up to two, $C_7$–$C_{12}$-alkyl up to three and $C_{13}$–$C_{22}$-alkyl up to five oxygen atoms in the chain. Specific examples are: 3,6-dioxahexyl, 3,6-dioxaheptyl, 3,6-dioxaoctyl, 3,6-dioxadecyl, 3,6,9-trioxadecyl and 3,6-dioxa-7-phenylheptyl.

Other suitable $R^1$ and $R^2$ radicals are $C_3$–$C_7$-cycloalkyl groups, which may carry halogen, $C_1$–$C_4$-alkyl or $C_1$–$C_4$-alkoxy as substituents. In the case of $R^2$, cyclopentyl is preferred and cyclohexyl is particularly preferred. Relevant examples are: cyclopropyl, cyclobutyl, cyclopentyl, cyclohexyl, cycloheptyl, 2,3-dichlorocyclohexyl, 3- and 4-methylcyclohexyl, 4-ethylcyclohexyl and 4-methoxycyclohexyl.

$R^1$ and $R^2$ are each particularly preferably phenyl, which in the case of $R^2$ is preferably unsubstituted but may also carry substituents such as $C_1$–$C_6$-alkoxy, in particular $C_1$–$C_4$-alkoxy, or cyano, but also halogen, hydroxyl, $C_1$–$C_6$-alkyl, carboxyl, $C_1$–$C_6$-alkoxycarbonyl or hydroxysulfonyl, examples being: phenyl, 2- chloro- and 2,4-dichloro-phenyl, 4-hydroxyphenyl, 2-cyanophenyl, 2-methylphenyl, 4-methoxyphenyl, 4-carboxyphenyl and 4-hydroxysulfonylphenyl.

$R^3$ is particularly preferably hydrogen, chlorine, bromine or methyl. Other possibilities are the other $C_1$-$C_6$-alkyls groups mentioned for $R^1$ and $R^2$.

Suitable anions $An^\ominus$ can be anions of inorganic or organic acids. Particular preference is given here to chloride, bromide, iodide, tetrafluoroborate, perchlorate and hexafluorophosphate and also to 4-methylbenzenesulfonate. It is also possible to use for example sulfate, phosphate, hexafluoroantianonate, trichlorozincate and tetraphenylborate and also methanesulfonate, benzenesulfonate, acetate, lactate and salicylate.

It is also possible to use the anions of heteropolyacids, for example containing phosphorus or silicon. Examples are molybdatophosphoric acid, molybdatosilicic acid, vanadatophosphoric acid, vanadatosilicic acid, tungstophosphoric acid, tungstosilicic acid and also mixed acids of this kind.

As will be known, these heteropolyacids or their salts are prepared by acidifying solutions or alkali metal or ammonium molybdates, vanadates and/or tungstates in the presence of water-soluble phosphates and/or silicates.

Other suitable anions $An^\ominus$ besides copper(I) hexacyano ferrate (II) are transition metal chelate complexes such as nickel dithiolates.

Preferred indolizinetrimethine dyes I are revealed in the Examples.

Methods for preparing indolizinetrimethines are common knowledge and described for example in Advances in Heterocyclic Chemistry 29, (1978), 104–167.

The indolizinetrimethine dyes I of the present invention can be prepared in a similar manner, for example by condensing indolizine derivatives of the formula II

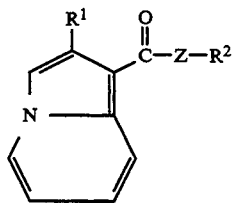
II with a trimethine compound, containing the group =CH—C($R^3$)=CH—, of one of the formulae IIIa–IIIe

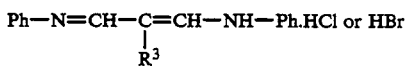    IIIa

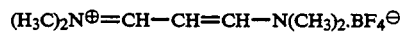    IIIb

    IIIc

    IIId

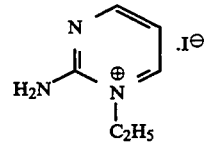    IIIe (where Ph = phenyl)

The reaction is advantageously carried out in an inert solvent such as acetic anhydride or a lower alcohol, e.g. methanol, ethanol or propanol, at from 40° to 140° C., in particular at from 80° to 120° C.

The indolizine derivatives II can likewise be prepared by the methods described in Advances in Heterocyclic Chemistry 23, (1978), 104–167.

The indolizinetrimethine dyes I of the present invention are strongly absorbing within the wavelength range from 680 to 700 nm. They are also very readily soluble in organic solvents, in particular lower alcohols, and thermoplastic or crosslinkable binders of the type used for producing optical recording media. They can therefore be applied directly, without a protective layer, to textured plastics supports by spin coating.

The optical recording media of the present invention consist of a support bearing a thin light-absorbing layer which, in addition to a dye I, may also contain a binder.

The support is advantageously made of a transparent material, such as glass or plastic. Suitable plastics are for example polyesters, epoxides, polyolefins (e.g. polyethylpentene), polyamides, polyvinyl chloride, polystyrene and polyvinyl esters, particularly polyacrylates and polymethacrylates and very particularly polycarbonates.

The light-absorbing layer is advantageously applied to the support as a solution of an indolizinetrimethine dye I of the present invention, which may additionally contain a binder and further additives such as antioxidants, singlet oxygen quenchers and UV absorbers and generally has a dye content of from 1 to 30% by weight, based on the solution, by spin coating and spun dry.

Suitable solvents for the solution in question are for example propanol, isopropanol, butanol, diacetcne alcohol, methyl ethyl ketone, toluene, bromoform, 1,1,2-trichloroethane and mixtures thereof.

The presence of a binder is not absolutely necessary, but is preferable none the less in order that the viscosity of the spin coating solution may be optimized and to ensure good long term stability of the recording media. Preferably, from 1 to 30% by weight of binder, based on the dissolved solids content, is added.

Suitable binders are for example polyorganosiloxanes, epoxides, polyacrylates, polymethacrylates, polystlrrene homopolymers and copolymers, polyvinylcarbazol, polyvinylpyrrolidone, polyimidazole copolymers, polyvinyl ester copolymers, polyvinyl ether copolymers, polyvinylidene chloride polymers, acrylonitrile copolymers, polyvinyl chloride and copolymers thereof, cellulose acetate and nitrocellulose. Preference is given to binders based on vinylpyrrolidone-vinyl acetate copolymers and polyvinyl chloride-polyvinyl ether copolymers.

In general, the abovementioned additives are added to the dye solution in an amount of up to 10% by weight, preferably up to 5% by weight, based on the dissolved solids content, antioxidants which likewise absorb in the near infrared, e.g. nickel thiolens complexes, as described in DE-A-3 505 750, DE-A-3 505 751 and Dyes and Pigments, 8 (1987), 381–388, can preferably be present in the spin coating solution in an amount of up to 10% by weight, based on the dissolved solids content of the solution.

Spin coating, as the term implies, means applying the solution to a spinning support, which advantageously has a round shape. However, it is also possible to apply the solution to the initially stationary support and only then set the support spinning. The solution is advantageously introduced onto the support using a syringe or capillary or by means of a mechanical pump.

The support generally spins at a speed of from 5 to 7,000 rpm, preferably at from 500 to 5000 rpm, the solution advantageously being introduced onto it at a relatively low speed (about 500–2000 rpm) and then being spun dry at a higher speed (about 5000–7000 rpm). The thickness of the laser light-sensitive layer ranges in general from 40 to 160 nm, preferably from 80 to 120 nm. It depends on the speed of rotation, on the concentration and viscosity of the spin coating solution and also on the temperature.

In the optical recording media of the present invention, the laser light-sensitive layer is present in the forth of a homogeneous, thin, smooth film of high optical quality. For instance, its reflectivities are in general within the range above 15%.

The novel recording media, furthermore, are sufficiently sensitive at the wavelength of the semiconductor lasers employed commercially in that irradiation with light pulses of a few nJ energy content which have been focused to spot diameters of $\leq 1$ μm results in formation of pits with an excellent signal-to-noise ratio.

EXAMPLES a) Preparation of indolizinetrimethine dyes I

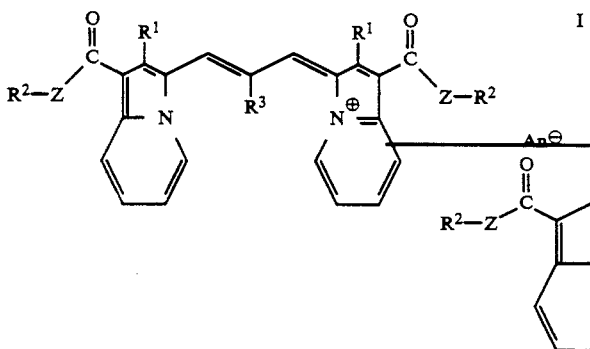

A mixture of 3.5 g (10 mmol) of 2-phenyl-3-(N-butyl-carbamoyl)indolizine and 1.6 g (5 mmol) of 1-dimethylamino-3-dimethylimino-1-propene tetrafluoroborate in 20 ml of acetic anhydride was heated to 100° C. for 30 min with stirring.

After cooling, the deep greenish blue reaction solution was added with stirring to 300 ml of methyl tert-butyl ether, and the dye I formed as a precipitate. It was separated off, repeatedly washed with methyl tert-butyl ether and purified by Soxhlet extraction with methyl tert-butyl ether.

This left 2.2 g of the dye

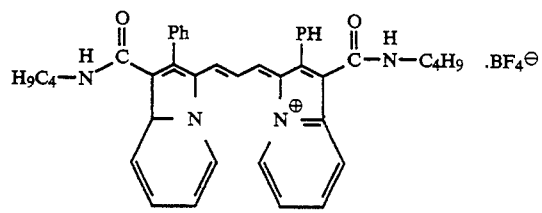

which corresponds to a yield of 42%.

EXAMPLES 2 TO 24

The method of Example 1 was used to prepare these dyes in similar yields by reacting a compound II with a compound III.

The table shows the particular dyes I and their absorption maxima $\lambda_{max}$ [run] measured in methylene chloride or dimethylformamide (DMF).

TABLE

| Ex. | $R^1$ | Z | $R^2$ | $R^3$ | $An^\ominus$ | $\lambda_{max}$ [nm] |
|---|---|---|---|---|---|---|
| 1 | —Ph | —NH— | —C$_4$H$_9$ | —H | BF$_4^\ominus$ | 695 (CH$_2$Cl$_2$) |
| 2 | —Ph | —NH— | —C$_2$H$_4$—OH | —H | BF$_4^\ominus$ | 682 (DMF) |
| 3 | —Ph | —NH— | —C$_2$H$_4$—OH | —Br | Br$_4^\ominus$ | 686 (CH$_2$Cl$_2$) |
| 4 | —Ph | —NH— | Cyclohexyl | —H | BF$_4^\ominus$ | 689 (DMF) |
| 5 | —Ph | —NH— | 4-Methyl-cyclohexyl | —H | BF$_4^\ominus$ | 689 (DMF) |
| 6 | —Ph | —NH— | —C$_4$H$_9$ | —Br | Br$^\ominus$ | 690 (DMF) |
| 7 | —Ph | —NH— | —C$_3$H$_6$—OH | —H | BF$_4^\ominus$ | 686 (CH$_2$Cl$_2$) |
| 8 | —Ph | —NH— | —C$_3$H$_6$—O—CH$_3$ | —H | BF$_4^\ominus$ | 689 (DMF) |
| 9 | —Ph | —NH— | —C$_4$H$_9$ | —H | BF$_4^\ominus$ | 690 (DMF) |
| 10 | —Ph | —NH— | —C$_5$H$_{11}$ | —H | BF$_4^\ominus$ | 689 (DMF) |
| 11 | —Ph | —NH— | —C$_6$H$_{13}$ | —H | BF$_4^\ominus$ | 689 (DMF) |
| 12 | —Ph | —NH— | Cyclopropyl | —H | BF$_4^\ominus$ | 689 (DMF) |
| 13 | —Ph | —NH— | —CH$_2$—Ph-4-OCH$_3$ | —H | BF$_4^\ominus$ | 689 (DMF) |
| 14 | —Ph | —NH— | —C$_2$H$_4$—OH | —Cl | Cl$^\ominus$ | 682 (DMF) |
| 15 | —Ph | —NH— | Cyclohexyl | —Br | Br$^\ominus$ | 694 (CH$_2$Cl$_2$) |
| 16 | —Ph | —O— | —C$_2$H$_5$ | —H | BF$_4^\ominus$ | 686 (CH$_2$Cl$_2$) |
| 17 | —Ph-4-O—CH$_3$ | —O— | —C$_2$H$_5$ | —H | BF$_4^\ominus$ | 687 (CH$_2$Cl$_2$) |
| 18 | —Ph | —O— | —C$_2$H$_5$ | —Br | Br$^\ominus$ | 687 (CH$_2$Cl$_2$) |
| 19 | —Ph | —O— | —C$_4$H$_9$ | —H | BF$_4^\ominus$ | 686 (CH$_2$Cl$_2$) |
| 20 | —Ph | —O— | Cyclohexyl | —H | BF$_4^\ominus$ | 686 (CH$_2$Cl$_2$) |
| 21 | —Ph | —O— | —CH$_3$ | —H | BF$_4^\ominus$ | 686 (DMF) |
| 22 | —Ph | —O— | —CH$_3$ | —Br | Br$^\ominus$ | 687 (CH$_2$Cl$_2$) |
| 23 | —Ph | —O— | —C$_2$H$_5$ | —CH$_3$ | I$^\ominus$ | 677 (CH$_2$Cl$_2$) |
| 24 | —Ph | —O— | —[(CH$_2$)$_2$—O]$_2$—C$_2$H$_5$ | —H | BF$_4^\ominus$ | 687 (CH$_2$Cl$_2$) | b) Application Examples

EXAMPLE 1

A 3% strength by weight solution of the dye of Example 2 in 1,1,2-trichloroethane was applied to a polycarbonate substrate by spin coating at 2000 rpm.

The layer obtained was homogeneous and highly reflective. It was very readily writable with a semiconductor laser (780 run). The recorded information items were readable with a good signal-to-noise ratio.

EXAMPLE 2

A 3% strength by weight solution of the dye of Example 4 in 80=20 v/v propanol/diacetone alcohol which, based on its solids content, contained 5% by weight of 4-octyl-4'-fluorodiphenyldithiolene nickel as stabilizer was applied to a polycarbonate disk by spin coating at 2000 rpm.

The resulting homogeneous highly reflective layer was very readily writable with a semiconductor laser and was particularly stable to UV light.

We claim:

1. An indolizinetrimethine dye of the general formula I where the variables are defined as follows:

$R^1$ is $C_1$–$C_{22}$-alkyl which may be substituted by halogen, hydroxyl, $C_1$–$C_6$-alkoxy, benzyloxy, $C_1$–$C_6$-alkanoyl, $C_1$–$C_6$-alkoxycarbonyl or phenyl, $C_3$–$C_7$-cycloalkyl, which may be substituted by halogen, $C_1$–$C_4$-alkyl or $C_1$–$C_4$-alkoxy, or phenyl which may be substituted by halogen, hydroxyl, cyano, $C_1$–$C_6$-alkyl, $C_1$–$C_6$-alkoxy, carboxyl, $C_1$–$C_6$-alkoxycarbonyl or hydroxysulfonyl, $R^2$ has one of the meanings of $R^1$, except than the carbon chain of $C_1$–$C_{22}$-alkyl may be interrupted by from one to five oxygen atoms in ether function, $R^3$ is hydrogen, halogen or $C_1$–$C_6$-alkyl, Z is —O— or —NH—, and $An^{\ominus}$ is one equivalent of an acid anion.

2. An indolizinetrimethine dye of the general formula I as claimed in claim 1, where the variables are defined as follows:

$R^1$ is $C_1$–$C_{22}$-alkyl, $\omega$-bromo- or $\omega$-hydroxy-$C_1$–$C_{12}$-alkyl, or phenyl which may be substituted by halogen, hydroxyl, cyano, $C_1$–$C_4$-alkoxy, carboxyl, $C_1$–$C_6$-alkoxycarbonyl or hydroxysulfonyl, $R^2$ is $C_1$–$C_{22}$-alkyl whose carbon chain may be interrupted by from one to five oxygen atoms in ether function, $\omega$-bromo- or $\omega$-hydroxy-$C_1$–$C_{12}$-alkyl, cyclopentyl, cyclohexyl, or phenyl which may be substituted by bromine, chlorine, $C_1$–$C_6$-alkyl or $C_1$–$C_6$-alkoxycarbonyl, and $R^3$ is hydrogen, chlorine, bromine or $C_1$–$C_6$-alkyl.

3. An indolizinetrimethine dye of the general formula I as claimed in claim 1, where the variables are defined as follows:

$R^1$ is phenyl which may be substituted by cyano or $C_1$–$C_4$-alkoxy, $R^2$ is $C_1$–$C_{12}$-alkyl whose carbon chain may be interrupted by from one to three oxygen atoms in ether function, $\omega$-bromo- or $\omega$-hydroxy-$C_1$–$C_{12}$-alkyl, cyclohexyl or phenyl, and $R^3$ is hydrogen, chlorine, bromine or methyl.

4. An optical recording medium for recording and reproducing information items by means of laser beams, containing in the light-sensitive layer an indolizinetrimethine dye of the formula I as claimed in claim 1 or 2 or 3.

* * * * *